United States Patent [19]

Jackovitz et al.

[11] 4,016,091

[45] * Apr. 5, 1977

[54] METHOD OF PREPARING HIGH CAPACITY NICKEL ELECTRODE POWDER

[75] Inventors: John F. Jackovitz, Monroeville; Earl A. Pantier, Verona, both of Pa.

[73] Assignee: Westinghouse Electric Corporation, Pittsburgh, Pa.

[ * ] Notice: The portion of the term of this patent subsequent to Mar. 2, 1993, has been disclaimed.

[22] Filed: Oct. 30, 1975

[21] Appl. No.: 627,330

Related U.S. Application Data

[62] Division of Ser. No. 558,110, March 13, 1975, Pat. No. 3,941,614.

[52] U.S. Cl. ............................ 252/182.1; 429/223
[51] Int. Cl.² ......................................... H01M 4/88
[58] Field of Search ............ 136/29; 106/306, 309; 423/138, 179; 252/182.1

[56] References Cited

UNITED STATES PATENTS

| | | | |
|---|---|---|---|
| 3,579,385 | 5/1971 | Pedusha et al. | 136/29 X |
| 3,600,227 | 8/1971 | Hardman | 136/29 X |
| 3,941,614 | 3/1976 | Jackovitz et al. | 136/29 |

*Primary Examiner*—C. F. LeFevour
*Attorney, Agent, or Firm*—D. P. Cillo

[57] ABSTRACT

An electrode plate is made by loading a supporting porous metallic plaque with active battery material made by: (1) hydrolyzing the reaction product of a starting material comprising an admixture of Ni oxide and effective amounts of sodium peroxide fused at temperatures between about 800°–1150° C, the hydrolyzed solid reaction product containing electrochemically active Ni hydrated oxides and hydroxide forms, (2) if desirable, drying the product below about 65° C, and (3) adding, at some step in the method, an amount of cobalt containing additive effective to provide about 2–12 wt% total Co in the active battery material based on Ni oxide plus Co content.

5 Claims, 6 Drawing Figures

CAPACITY OF HYDROLYZED NaNiO₂: 3.4–4.4 WT% COBALT

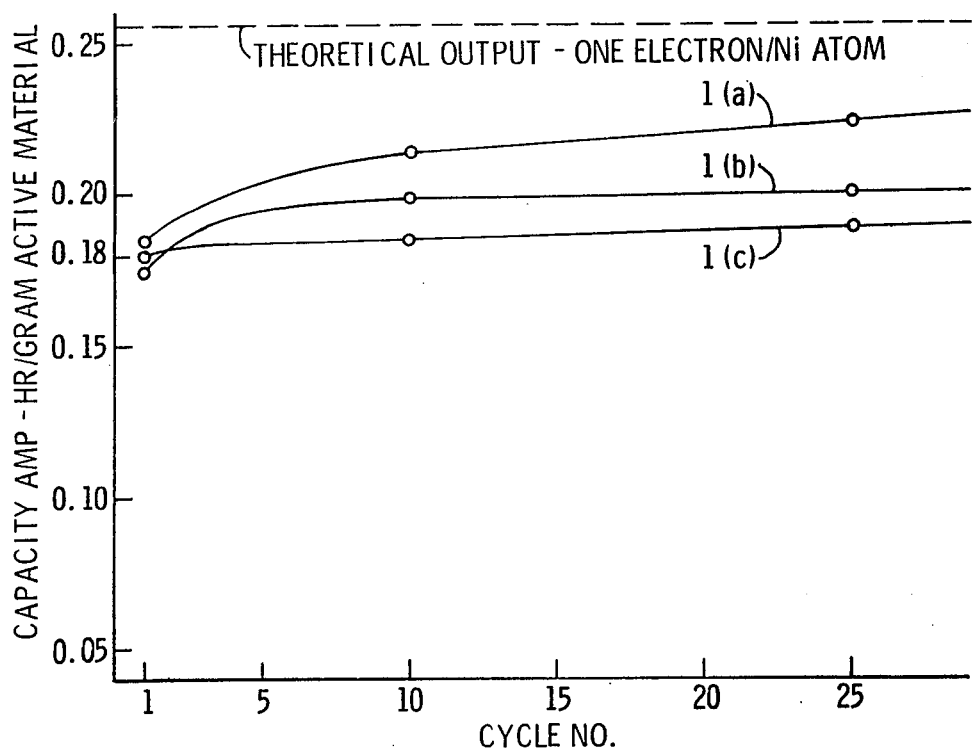
FIG. 1. CAPACITY OF HYDROLYZED $NaNiO_2$: 3.4-4.4 WT% COBALT
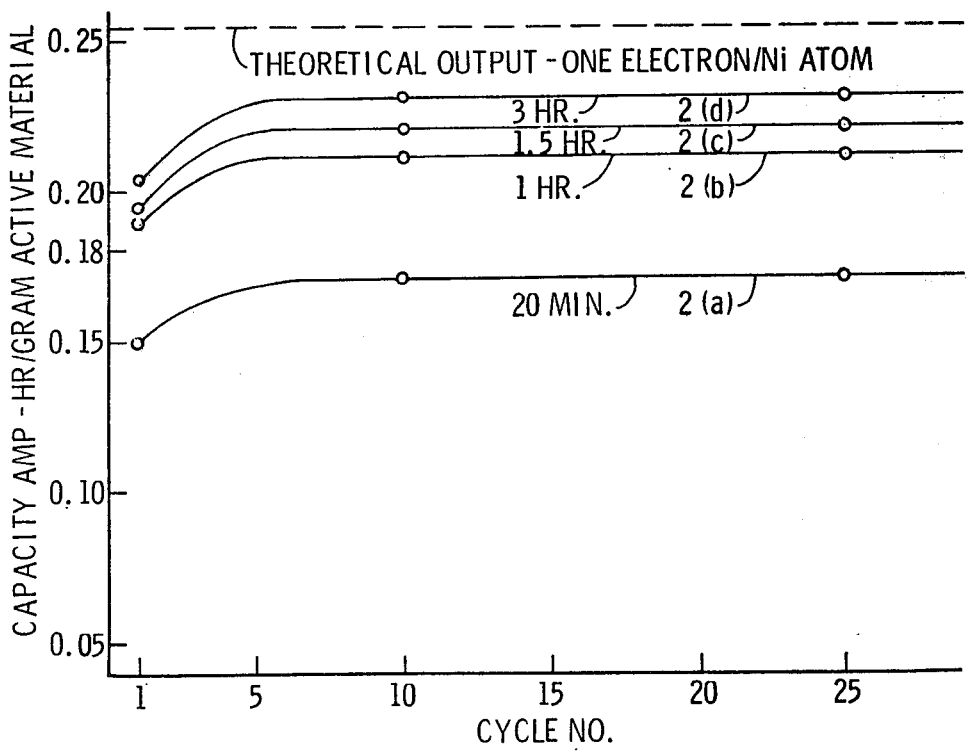
FIG. 2. CAPACITY OF HYDROLYZED $NaNiO_2$:5.5 WT% COBALT AT 1000°C - EFFECT OF REACTION TIME

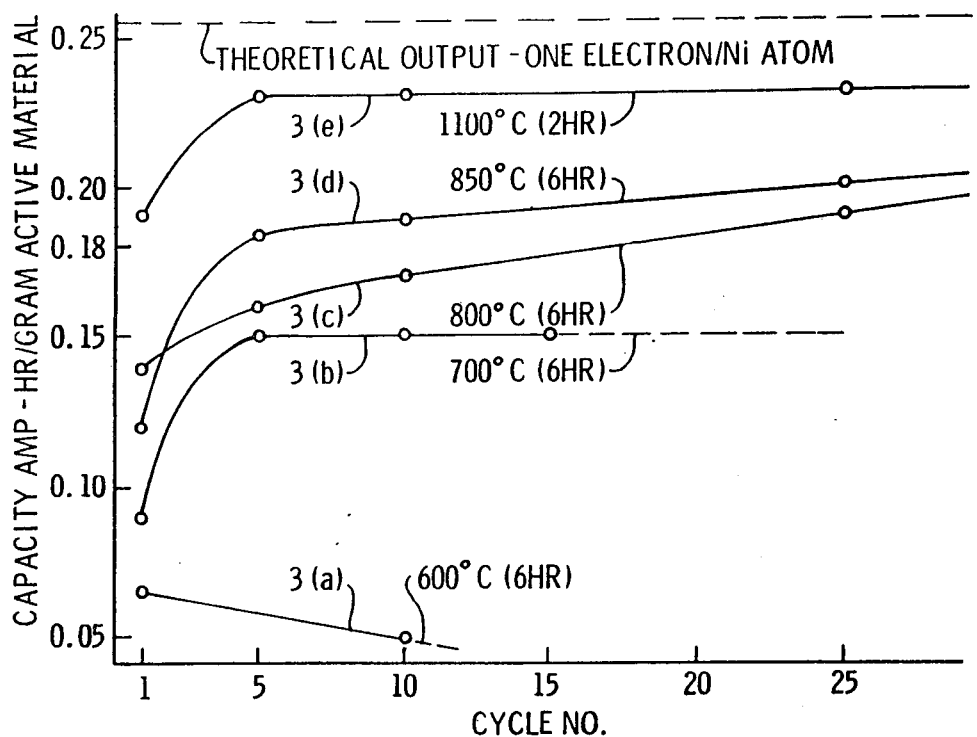
FIG. 3. CAPACITY OF HYDROLYZED $NaNiO_2$: 5.5 WT% COBALT
EFFECT OF REACTION TEMPERATURE
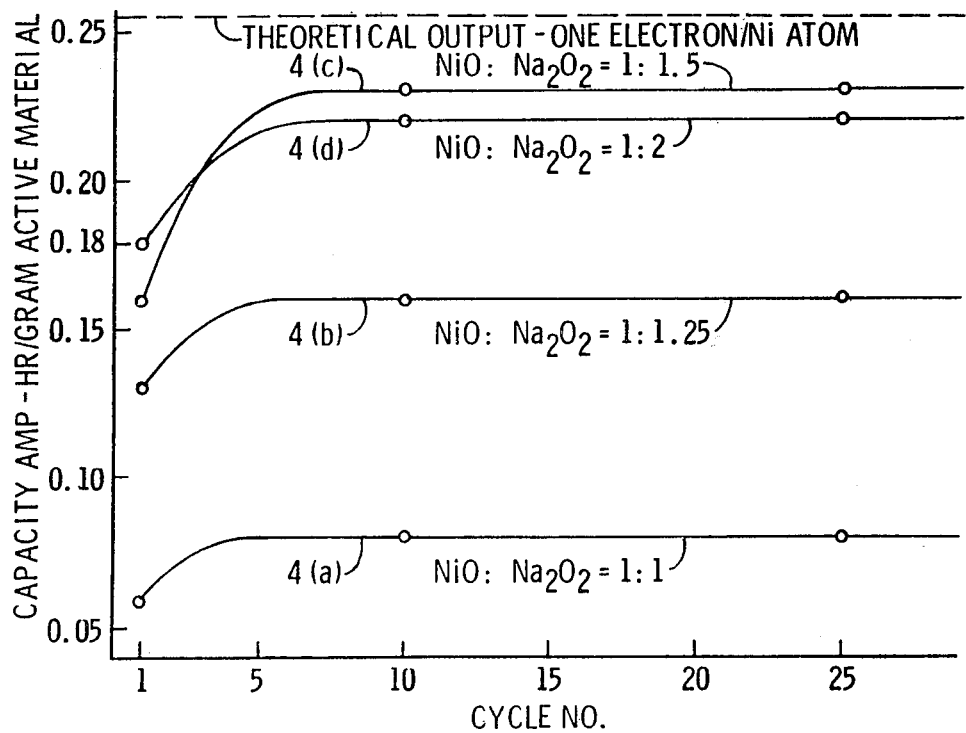
FIG. 4. CAPACITY OF HYDROLYZED $NaNiO_2$: 5.5 WT% COBALT
EFFECT OF NiO: $Na_2O_2$ WEIGHT RATIO

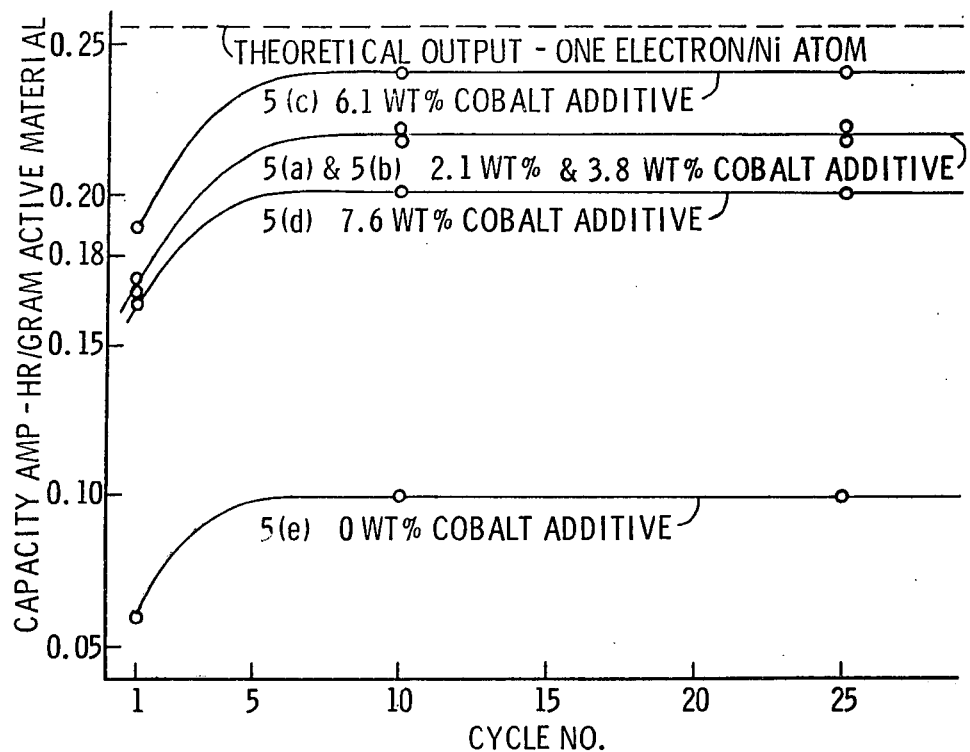
FIG. 5. CAPACITY OF HYDROLYZED $NaNiO_2$: COBALT EFFECT OF WT% COBALT ADDITIVE
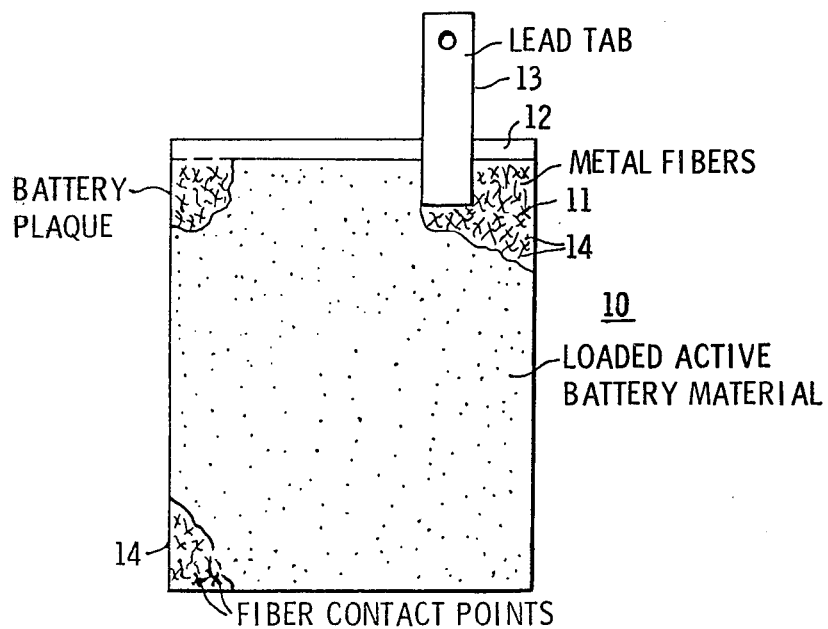
FIG. 6

METHOD OF PREPARING HIGH CAPACITY NICKEL ELECTRODE POWDER

This is a division of application Ser. No. 558,110 filed Mar. 13, 1975, now U.S. Pat. No. 3,941,614.

BACKGROUND OF THE INVENTION

The fusion of metallic nickel with sodium dioxide was reported in 1896 by W. L. Dudley in 18 J. Am. Chem. Soc. 901. Dudley fused sodium dioxide in a nickel crucible with nickel metal at a cherry-red heat, about 700°–800° C, for about one hour. After cooling, the contents were submerged in water. The formed brown crystals were then washed to remove alkali. The crystals were then dried at 110° C. The crystals were analyzed and believed to be the dihydrate $Ni_3O_4 \cdot 2H_2O$, with 0.7 wt% cobalt as an impurity. A cobaltocobaltic dihydrate $Co_3O_4 \cdot 2H_2O$ is also described as obtained by exposing to moist air $Co_3O_4$, prepared by heating cobalt carbonate. These materials were believed to be new compounds but no active battery material or electrochemical use was suggested.

Presently used methods for the preparation of nickel active battery material involve chemical precipitation or electrochemical precipitation of divalent nickel (II) hydroxide, as taught for example by Feduska et. al. in U.S. Pat. No. 3,579,385 and Hardman in U.S. Pat. No. 3,600,227. Faber, in U.S. Pat. No. 3,436,267, converted directly to trivalent Ni (III) hydroxide battery material, by 100% oxidation of finely divided Ni (II) hydroxide powder in a gas stream containing ozone. He then pasted this material into an electrode plaque.

The usual procedure in making a battery plate involves loading the divalent nickel (II) hydroxide into a porous plaque, with oxidation of the material in the plaque to a form of trivalent nickel (III) hydroxide. This is accomplished by elctrochemical charging and discharging "formation" of the loaded plaque in an alkaline electrolyte, prior to introduction of the plaque into a battery.

Ozone treatment involves a complex process using expensive equipment. Electro-precipitation processes are also costly and represent a disproportionate share of the raw materials expense in iron-nickel batteries, while chemical precipitation methods result in gelatinous materials which are difficult to load into a conducting matrix.

All three of these methods involve initial production of nickel hydroxide. Chemical precipitation means high cost starting materials, precipitation, filtering, washing, drying, grinding, etc., all of which make the cost of the final electrode powder high. Electro-precipitation and ozone treatment involve major capital expenditures for hardware in addition to high costs for starting materials.

With the increasing importance of improved batteries as a clean power source, especially in the transportation area, there is a need for improved active materials, that will provide capacities closer to the theoretical limit than heretofore possible. To make these batteries commercially feasible, the costs of active material manufacture must be drastically reduced. What is needed then is a method of making inexpensive highly active materials.

SUMMARY OF THE INVENTION

We have discovered a process that will provide an improved activated battery material mixture, by chemically reacting NiO, which may also have added to it about 2–12 wt% Co based on NiO plus Co content as a material selected from Co, CoO, $Co_2O_3$, $Co_3O_4$, or their mixtures, with effective amounts of $Na_2O_2$, generally within a weight ratio of $NiO:Na_2O_2$ of 1:1.35 to 1:2.1. This nickel oxide-sodium peroxide mixture is reacted at temperatures between about 800°–1150° C, for a period of time, generally about ½ – 8 hours, effective to form $NaNiO_2$ or $NaNiO_2$ plus $NaCoO_2$ melted reaction product.

The reaction product, comprising $NaNiO_2$, is then hydrolyzed. If the cobalt oxide or elemental cobalt additive was not added initially, before fusion, as is preferred, it will be added generally as cobalt hydroxide after hydrolysis, or as a water soluble cobalt salt such as cobalt chloride or cobalt nitrate during hydrolysis, after hydrolysis or after plaque loading.

This process will provide a final solid active battery material containing over about 95 wt% solid Ni hydrated oxides and hydroxide forms and Co hydroxide forms, the remainder being interlaminar sodium. It is important that about 0.5 to 5 wt% but preferably 0.5 to 3 wt% unreacted $NaNiO_2$ be present after hydrolysis and drying. The unreacted $NaNiO_2$ is present, in the active material as interlaminar sodium in the nickel oxy-hydroxide layers and helps prevent swelling of the active material in the plate during the life of the battery.

This activated battery material is washed and generally dried after which it can then be loaded into a supporting porous plaque to provide an electrode plate, which may then be electrochemically cycled or "formed" (electrically charged and discharged in an alkaline electrolyte) prior to use in a battery opposite a suitable negative electrode. The drying step is generally carried out at temperatures below about 65° C, or at a suitable temperature in a high moisture atmosphere so that water present in the active material structure is not eliminated to an extent to cause the material to lose activity.

This process involves conversion of nickel oxide, or nickel oxide with added cobalt as elemental cobalt or cobalt oxide to an active battery material powder without tedious filtering or washing steps and without use of expensive electrical equipment. The starting materials cost is significantly reduced, since nickel oxide is the least expensive nickel containing material commercially available. Starting with nickel oxide makes the process useful and commercially feasible, since it eliminates a prolonged oxidation step at high temperatures which is sure to degrade the reaction container. Starting materials cost relative to the chemical, electrochemical and ozone processes is drastically reduced by at least 50%. In addition, a by-product of this process is an aqueous alkali metal hydroxide solution which may be further used as a battery electrolyte by suitable processing, or used as a basic material for neutralizing mine acid pools and the like.

BRIEF DESCRIPTION OF THE DRAWINGS

For a better understanding of the invention, reference may be made to the preferred embodiments exemplary of the invention, shown in the accompanying drawings in which:

FIG. 1 is a graph showing the performance of the three Example 1 nickel electrode plates, in terms of capacity versus cycle number, in relation to the theoretical capacity value;

FIG. 2 is a graph showing the effect of NiO + CoO + $Na_2O_2$ reaction time on the performance of nickel electrode plates;

FIG. 3 is a graph showing the effect of NiO + CoO + $Na_2O_2$ reaction temperature on the performance of nickel electrode plates;

FIG. 4 is a graph showing the effect of the weight ratio $NiO:Na_2O_2$ on the performance of nickel electrode plates;

FIG. 5 is a graph showing the effect of the cobalt concentration on the performance of nickel electrode plates; and, FIG. 6 shows a preferred electrode plaque loaded with the active battery material of this invention.

DESCRIPTION OF THE PREFERRED EMBODIMENTS

One embodiment of a battery, utilizing the improved active material and electrode plate of the invention, would generally comprise a plurality of alternate positive nickel plates and negative plates such as, for example, loaded iron active material plates. This stack up would contain plate separators between the positive and negative plates, all contacted by alkaline electrolyte and housed in a case having a cover, a vent, and positive and negative terminals.

Preferred electrode plaques, shown in FIG. 6, are made from metal fibers, preferably nickel, or metal protective coated fibers, such as nickel coated steel or iron. A very suitable material is nickel coated steel wool. The plaque 10, is a flexible, expansible, compacted sheet of relatively smooth, generally contacting, intermingled, metal fibers as shown at 11 in the body of the plaque. The plaque has, in the embodiment shown, top edge 12 coined to a high density. The coined area provides a base to which lead tab 13, which is attached to battery terminals, is spot welded. The plaque is generally between about 90 and 95% porous. This range is preferable in providing improved conductivity and electrolyte permeability, while maintaining enough body for good plaque loading. Activated nickel electrode material is loaded into the interstices of the body of this fibrous plaque to provide an electrode plate. This invention, however, is not restricted to the preferred plaque structure described herein, and the active material can be used with other metallic plaque structures.

The metal fibers are preferably diffusion bonded in a protective atmosphere at temperatures up to the sintering point of the fibers used. In diffusion bonding, the fibers must not be melted, or protuberances will be formed reducing active material loading (volume) within the plaque. There should only be a metallurgical bond and interdiffusion of atoms across the fiber interface at fiber contact points 14 along the fiber lengths. Diffusion bonding provides a flexible, expansible electrode structure having a large pore volume into which active material can be pasted or otherwise impregnated. Diffusion bonding also lowers the electrode plate resistance appreciably and thus the internal cell resistance in a finished cell.

The active material is prepared by mixing the nickel oxide with sodium peroxide and then heating the nickel oxide (NiO) and sodium peroxide ($Na_2O_2$). These materials are generally in powdered or particulate form. The starting material preferably contains between about 2-12 wt% cobalt, based on Ni plus Co, added as elemental cobalt or preferably as a cobalt oxide such as $Co_2O_3$, $Co_3O_4$, CoO or their mixtures. These reactants are preferred to be of moderate to high purity. They are fused and melted, generally in a suitable high temperature resistant container, for example a nickel crucible, in an oxidizing or inert atmosphere, in an oven maintained at a temperature of between about 800°–1150° C, for about ½ – 8 hours. It is essential in terms of a commercial process to use the oxidized nickel (NiO) as starting material, since otherwise long oxidation of Ni to NiO will seriously degrade and ruin the expensive reaction container.

In the reaction, the sodium peroxide decomposes to form $Na_2O$ which oxidizes the NiO. We have found, unexpectedly, that a high capacity, easily pasteable active battery material is formed when the reaction product is then hydrolyzed, generally by immersion in water, to cause a decomposition reaction and formation of Ni hydrated oxides and Ni hydroxide forms and cobalt hydroxide. The active material is generally washed until neutral to litmus and then may be dried at a temperature that will not degrade activity, e.g., between about 15° – 65° C. The NaOH formed could be drawn off in some continuous fashion and concentrated by evaporation, for example, into a saleable product.

A set of equations which in part describes the basic preferred fusion and hydrolysis reactions can be given as:

$$NiO + CoO + Na_2O_2 \xrightarrow[\text{(Fusion)}]{1000° C} NaNiO_2 + NaCoO_2$$

$$2NaNiO_2 + NaCoO_2 + 3H_2O \longrightarrow Ni(OH)_2 + CoOOH + NiO_2 \cdot (1-2)H_2O + 3NaOH$$

We found in accordance with the prior art that cobalt addition was necessary at some step in the method to provide an active material in the electrode plate which would have superior electrochemical performance, i.e., a capacity of about 0.185 amp-hours/gram active material, after 25 cycles.

The cobalt, in the form of elemental Co or cobalt oxide is added preferably before the fusion step, but cobalt additive may be added instead to the paste after the hydrolysis step, generally as cobalt hydroxide Co(OH)$_2$, prior to incorporation into the plaque. When cobalt additive is added as elemental cobalt or as a cobalt oxide, before fusion, the active material contains cobalt (III) hydroxide; if added in a C. hydroxide form after hydrolysis, the active material contains cobalt (III) hydroxide. Cobalt hydroxide is expensive and when added after hydrolysis does not provide completely homogeneous mixing.

Generally the nickel hydrated oxides and hydroxide forms will be washed to remove most of the NaOH and the cobalt hydroxide may be added as an aqueous slurry; or the nickel material may be dried and the cobalt hydroxide mixed with it in a suitable mill or other type mixer. Also, during or after hydrolysis, aqueous cobalt chloride (Co(Cl)$_2$ . 6H$_2$O) or cobalt nitrate (Co(NO$_3$)$_2$ . 6H$_2$O) additive may be used, in which case after reaction with alkaline hydroxide present or added, the final active material will contain cobalt (II) hydroxide, $Co(OH)_2$. Addition of an appropriate amount of cobalt nitrate solution to the alkaline slurry after hydrolysis results in a fairly uniform dispersion of $Co(OH)_2$ precipitate with the nickel active material.

The plaque can also be loaded with battery material not containing cobalt, and then dipped for an adequate period of time in aqueous cobalt nitrate or chloride solution, dried, and finally dipped in alkali hydroxide, such as KOH, NaOH, or LiOH, to provide a precipitate of $Co(OH)_2$ in the material. This would also provide a useful method to upgrade the cobalt content of loaded plaques.

In all cases, cobalt addition is preferred and the total weight percent of cobalt, as Co in the active material, must be between about 2–12 wt% and preferably about 5–8 wt% of the initial weight of NiO plus Co, i.e. wt% Co = Co/(NiO + Co) Cobalt concentration below 2 wt% and above 12 wt% detracted from acceptable performance. Failure to add cobalt to the plaque provided a plate having a capacity of about 0.10 amp-hr/g. A useful active material can be made without containing cobalt, but a plate containing such material, before being used in a battery, should be dipped in a cobalt solution to insure cobalt content and obtaining higher capacity.

We found that the weight ratio of NiO to $Na_2O_2$ was critical in providing an electrode plate having acceptable electrochemical performance. The weight ratio of $NiO:Na_2O_2$ must be between about 1:1.35 to about 1:2.1. An amount of $Na_2O_2$ less than about 1.35 parts per 1 part NiO would provide relatively poor performance. A 1:1 weight ratio of $NiO:Na_2O_2$ provided a mixture that remained in slurry form with incomplete reaction. An amount of $Na_2O_2$ over about 2.1 parts per 1 part NiO causes rapid destruction of the reaction vessel and does not provide increased electrochemical capacity. Other peroxides similar to sodium peroxide, such as lithium peroxide or lithium oxide and potassium superoxide as well as barium, strontium, and calcium alkaline earth peroxides were found unsuitable.

We found that the temperature and time of reaction melt fusion of the NiO and $Na_2O_2$ influenced the capacity of the active product. Temperatures around 700°–750° C provided a reaction mixture that was still somewhat semi-solid, indicating slow and incomplete formation of $NaNiO_2$ and incomplete intimate reaction of the NiO and $Na_2O_2$. At a temperature of 600° C most of the NiO does not react. Temperatures held, after heating the oven, at over 1150° C provide materials problems in finding suitable reaction vessels which will not degrade very quickly and add deleterious materials to the fused $NaNiO_2$.

The useful temperature range for complete fusion-reaction, to be maintained after heating the oven, is between about 800°–1150° C. The preferred fusion-reaction temperature range, to be maintained after heating the oven, is from about 850°–1100° C. The most preferred temperature range in order to assure reuse of the preferred nickel reaction vessel is between about 850°–925° C. The time necessary for fusion will vary depending on temperature. At 800°–850° C, 6–8 hours is generally sufficient for complete reaction, while at 850°–1100° C or higher, ½–3 hours is generally adequate. The best performance was observed at a fusion-reaction temperature of 1000° C for 2 hours.

The water temperature for the hydrolysis reaction of the $NaNiO_2$ can be between about 10°–95° C but preferably between about 20°–35° C. When reacted between 20°–35° C the reaction provides more Ni (III) hydroxide i.e., a weight ratio of Ni (II) hydroxide:Ni (III) hydroxide of over about 1:2 providing better electrochemical properties. A higher concentration of the more crystalline Ni (III) hydroxide also provides a composition that loads better into the plaque. The molten $NaNiO_2$ can be quenched in water at $NaNiO_2$ temperatures below about 600° C, i.e., the $NaNiO_2$ can be cooled to below 600° C and then immersed in water; this however produces a very active hydrolysis, and it is preferred to cool the $NaNiO_2$ to between 20°–95° C before hydrolysis. Also of particular advantage in this method, NaOH solution is produced which may be further used as a battery electrolyte.

The final active material will contain nickel hydrated oxides and hydroxide forms plus cobalt hydroxide. It will also contain about 0.5 to 5 wt% but generally about 2 wt% unhydrolyzed or unreacted $NaNiO_2$, based on dried nickel hydrated oxides and hydroxides plus cobalt hydroxide forms. This sodium material imparts important reduced swelling properties. The active material is then washed and dried. This material can be made into a high density fluid active battery paste for application to battery plaques. The active material after drying up to 65° C contains water molecules between spaced —O—Ni—O— layers. It is essential that the water remain in the structure. Therefore, drying is of a partial nature and must be accomplished at a temperature and humidity effective to retain an optimum amount of the interlaminar $H_2O$. Generally the temperature limits are between about 15° to 65° C with a preferred range of 20°–40° C. Above 65° C drying and the electrochemical activity starts to decrease. Above 100° C drying, the electrochemical activity continues to decrease to the extent that the material starts to become inactive. Above 130° C involves complete drying and the cubic NiO electrochemically inactive state is formed.

For simplicity, one of the nickel hydroxide forms comprising the final hydrated active material has been written as nickel (III) hydroxide. This is a simplified way of stating an average between Ni (II) and Ni (IV) hydroxides. There is considerable speculation as to the precise formula of the higher valent, oxidized nickel hydroxide. Analysis of several samples of hydrolyzed $NaNiO_2$ were obtained using the dimethylglyoxime gravimetric technique. The results indicate that a primary nickel compound corresponds to a stoichiometry of $Ni_3O_4 \cdot 2H_2O$, a nickel oxide hydrate. For the purposes of this application, the term nickel (III) hydroxide and nickel hydrated oxides and hydroxide forms will be used to identify the electrochemically active nickel compound obtained by the substantially complete chemical hydrolysis reaction of $NaNiO_2$.

The sodium peroxide, nickel oxide, cobalt and cobalt oxide starting materials, as well as cobalt hydroxide and water soluble cobalt salt additives are preferred to be substantially pure, i.e., no more than about 5% of electrochemically harmful impurities that cannot be washed away. Fortunately, commercial grades of black nickel oxide powder are sufficiently pure to be used as supplied.

EXAMPLE 1

An electrode powder active battery material containing about 98 wt% cobalt . nickel hydroxide was mixed by placing in a container and thoroughly blending 7.6 grams (0.10 mole) of 99+% pure, finely divided black nickel oxide, NiO, (containing 78 wt% or 5.9 grams Ni) and 0.38 grams (0.005 mole) of 99% pure cobalt oxide, mostly in the form of CoO, (containing 70 wt% or about 0.27 gram Co) with 11.7 grams (0.15 mole) of C. P. (96.5% chemically pure) grade sodium peroxide, $Na_2O_2$. The nickel oxide consisted essentially of NiO and was commercially available as INCO black NiO; the cobalt oxide comprised mostly CoO and was commercially available as BAKER reagent cobalt oxide, containing 70 wt% Co. This provided approximately a 3.4 wt% cobalt concentration based on nickel oxide plus cobalt content, i.e., 0.27 g Co divided by (7.6 g NiO + 0.27 g Co); and a weight ratio of $NiO:Na_2O_2$ of about 1:1.54.

This mixture was then placed in a nickel crucible and gradually heated for about 1 hour up to about 800° C in air, in a ceramic lined oven with Nichrome heating coils. Temperatures were monitored using a Pt-PtRh thermocouple introduced at the rear of the oven. After the oven was heated up to 800° C, the temperature was increased and maintained at the fusion-reaction temperature of between about 950°–1025° C for an additional 1 hour, to ensure substantially complete chemical melt-fusion reaction to a substantially pure $NaNiO_2$ $NaCoO_2$ mixture.

The crucible and reaction product contents were then cooled to about 25° C over a 6 hour period, after which the crucible containing a solid mass of material was immersed in a 250 ml beaker of water at about 25° C. The contents hydrolyzed over a 12-hour period, and dispersed in the water to provide an active battery material powder containing about 98 wt% reacted oxide hydrates and hydroxides with about 2 wt% sodium on a dried basis as unreacted $NaNiO_2$. The heavy brown-black solid active material settled immediately in the beaker and was separated using a conventional Buchner apparatus. It was washed with successive 100 ml portions of water until neutral to litmus. This provided a dense brown-black crystalline powder material. It was noted that the nickel crucible was somewhat degraded after the reaction. The filtrate consisted of NaOH solution, which could be used later as a battery electrolyte.

This active battery powder was then air dried at only 25° C, so as not to eliminate interlaminar water in the crystals, and sieved to −325 mesh, i.e., about 98% of the powder had a diameter of less than about 44 microns. This powder was then loaded into nickel battery plaques or grids. The grids were 90–95% porous, 100 mil thick diffusion bonded nickel plated steel wool fiber plaques, having an area of about 1 sq. in. They were loaded using a conventional suction platform. An aqueous slurry of the active material was made to provide a high density fluid paste which was added from a blender until the plaques were filled. Additional water was dropped onto the loaded electrode plates from a funnel to obtain optimum packing within the plaque support.

Sample 1(a) electrodes, having an initial thickness of about 100 mils, were then pressed at about 20,000 lb/sq.in., to a final thickness approximating 60 mils. The loading in each plaque was about 1.5 grams/sq.in. of plaque surface area. Sample 1(b) electrodes, having an initial thickness of about 100 mils, but more heavily loaded, were then pressed at about 20,000 lb/sq.in., to a final thickness approximately 80 mils. The loading in each plaque was about 2.5 grams/sq.in.

The nickel electrodes of Samples 1(a) and 1(b) were set opposite negative electrodes in several containers, and contacted with electrolyte to form electrochemical cells. The nickel hydroxide electrodes were "formed", i.e., charge and discharge cycled versus sintered cadmium electrodes of considerably larger size and capacity. They were charged for about 2¼ hours at a current density of about 0.3 amp/sq.in. in 25 wt% aqueous KOH and discharged through a 10 ohm resistor at a current density of approximately 120 mA/sq.cm. in 25 wt% aqueous KOH electrolyte. The amount of charge for each cell was adjusted to about 250% of the theoretical nickel capacity based on a single electron transfer per nickel atom.

The cycling increases the porosity of the electrode, allowing increased electrolyte penetration and higher output. Initially, the active material is tightly packed and the electrolyte is restricted from contacting the interior of the electrode. An electrode is ready for use after "forming" for about 10 to 35 cycles. The active material after "formation" did not show any appreciable swelling in the battery electrode plate.

Capacity values which we considered acceptable for nickel hydroxide battery material were over about 0.185 amp-hr/gram active material after 25 cycles. This would provide an active battery material highly effective in approaching theoretical values and much improved over the prior art. Theoretical values for one-electron transfer, at 0.255 amp hr/g, are shown on FIG. 1 as a broken horizontal line. The capacity of the electrodes made by the method described above are also shown on FIG. 1, as curves 1(a) and 1(b), providing a capacity at 25 cycles of between about 0.225–0.20 amp-hr/g. The electrochemical performance of Sample 1(b) is about the same as for Sample 1(a) even though the electrode is much thicker and more heavily loaded. This is of particular advantage, indicating that low loadings, providing even lower materials costs, will still provide excellent electrochemical results.

An electrode powder active battery material, Sample 1(c), containing about 98 wt% reacted oxide hydrates and hydroxide forms was made by adding about 10 grams reagent grade, 99% pure, cobalt nitrate solution, $Co(NO_3)_2 \cdot 6H_2O$, (containing 20 wt% or 0.35 gram cobalt) to the strongly alkaline hydrolyzed slurry after the crucible was immersed in water, rather than adding cobalt additive to the NiO + $Na_2O_2$ mixture before fusion. This provided an active battery material containing cobalt (II) hydroxide dispersed throughout. The mixture before fusion contained 7.6 grams NiO and 11.7 grams C. P. grade sodium peroxide, providing a weight ratio of $NiO:Na_2O_2$ of about 1:1.54. The same fusion, cooling, hydrolysis and washing cycle was followed as described for Samples 1(a) and 1(b) above. The cobalt concentration based on nickel oxide plus Co content was 4.4 wt%, i.e., 7.6 g. Ni:0.35 g. Co. This active battery material was loaded, pressed, set opposite negative electrodes to form a cell, and charged and discharged as described above for Sample 1(a).

The capacity of this electrode is also shown in FIG. 1, as curve 1(c), providing a capacity at 25 cycles of about 0.19 amps-hr/g. Mixing the cobalt additive initially as CoO, as in Samples 1(a) and 1(b), appears to provide an electrode active material with more capacity, probably because of the intimate interaction with NiO and $Na_2O_2$ during the melt-fusion reaction, and is the preferred method of adding cobalt to the battery material.

The cobalt could also be added by dipping or spraying a plaque containing the nickel hydroxide after loading, followed by dipping or spraying with high purity alkali hydroxide to precipitate cobalt hydroxide and then washing the plaque. When the cobalt weight percent is between 2-12 wt% the results would be similar to Sample 1(c). Cobalt can also be added as high purity $Co(OH)_2$ after hydrolysis and when the cobalt weight percent is between 2-12 wt% the results would again be similar to Sample 1(c). None of the post fusion cobalt addition methods, either as a cobalt hydroxide or as soluble cobalt nitrate or cobalt chloride salts, provide as complete a homogeneous mixing of the cobalt with the nickel hydroxides.

Nickel analysis of several batches of the hydrolyzed $NaNiO_2$ of Samples 1(a) and 1(b) were obtained, using the dimethyglyoxime gravimetric technique. The results indicate 50-60 wt% nickel due to varying degrees of hydration, plus cobalt, oxygen and residual sodium, as shown in TABLE 1 below:

TABLE 1

| Nickel analysis for fully hydrolyzed $NaNiO_2$ samples | | |
|---|---|---|
| Sample Wt. (g.) | Ni Content (g) | % Ni |
| 0.155 | 0.0890 | 57.6 |
| 0.147 | 0.0902 | 61.4 |
| 0.151 | 0.0842 | 55.7 |
| 0.148 | 0.0840 | 56.8 |

The leaching of sodium from $NaNiO_2$ was very slow. Even after a week of washing a sample of finely ground $NaNiO_2$ with water, the sodium content was still about 1.0 percent.

The hydrolyzed $NaNiO_2$ starts to lose significant weight above 130° C. Some interlaminar water is believed to be lost at heating temperatures over about 45°-65° C. In the range of 130°-240° C, the compound loses oxygen and residual water amounting to about 13.0 wt%. Heating above about 130° C involves complete drying and eliminates almost all interlaminar water, causing Ni in the crystal structure to link with 4-6 oxygen atoms forming a cubic electrochemically inactive state. The values resulting from the dimethyglyoxime analysis of the active material closely correspond to a stoichiometry of nickelo-nickelic hydrate, $Ni_3O_4 \cdot 2H_2O$, in a layer like —O—Ni—O—Ni—O—Ni—O— form with interlaminar water, which on conversion to NiO, would lose about 18.9% of its weight. The nickel content of $Ni_3O_4 \cdot 2H_2O$ is calculated to be about 63.6%. The values given in TABLE 1, when corrected for the 5-6% cobalt additive, agree with this percentage reasonably well.

EXAMPLE 2

An electrode powder active battery material was mixed by placing in a container and thoroughly blending 7.6 grams of 99+% pure NiO (containing 5.9 grams Ni) and 0.56 grams of 99% pure cobalt oxide (containing about 0.44 grams Co) with 11.7 grams of C.P. grade sodium peroxide, $Na_2O_2$. This provided approximately a 5.5 wt% cobalt concentration based on nickel oxide plus cobalt content, i.e., 7.6 g. NiO + 0.44 g. Co and a weight ratio of $NiO:Na_2O_2$ of about 1:1.54.

This mixture, i.e., $NiO:1.5\ Na_2O_2$ with 5.5 wt% Co, was then placed in nickel crucibles and 4 batches, Samples 2(a)-2(d), gradually heated about 1 hour up to 800° C in air, in a ceramic lined oven with Nichrome heating coils. Temperatures were monitored using a Pt-PtRh thermocouple introduced at the rear of the oven. The temperature was then increased and maintained at the chemical fusion-reaction temperature of 1000° C for further periods of 20 minutes, Sample 2(a); 1 hour, Sample 2(b); 1.5 hours, Sample 2(c); and 3 hours, Sample 2(d); to determine the effect of fusion-reaction time on the electrochemical performance of the active battery material.

The crucible was then cooled to 25° C and immersed in water at 25° C to hydrolyze and disperse the contents. The hydrolyzed material containing about 98 wt% reacted hydrated oxide and hydroxide forms and 2 wt% unreacted $NaNiO_2$ on a dried basis, was then washed until neutral to litmus, dried at 25° C, loaded into nickel battery grids, and set opposite negative electrodes to form cells; all steps using the same techniques as described in Sample 1(a) in EXAMPLE 1.

The electrochemical activity of these electrodes are shown on FIG. 2. The material heated at 1, 1.5 and 3 hours at the fusion-reaction temperature of 1000° C provided capacity values at 25 cycles of about 0.21, 0.22 and 0.23 amp-hr/g. The material heated for 20 minutes at the fusionreactor temperature provided capacity values at 25 cycles of 0.17 amp-hr/g. Suitable reaction times at fusion-reaction temperatures of 800°-1150° C would appear from this data to be over about ½ hour and probably up to about 8 hours at the 800° C temperature range.

EXAMPLE 3

An electrode powder active battery material was made as in EXAMPLE 2, i.e., $NiO:1.54\ Na_2O_2$ with 5.5 wt% Co. Samples of this mixture were then placed in a nickel crucible and heated for 6 hours at 600° C, Sample 3(a); 6 hours at 700° C, Sample 3(b); 6 hours at 800° C, Sample 3(c); 6 hours at 850° C, Sample 3(d); and 2 hours at 1100° C, Sample 3(e), after initial furnace heating, to determine the effect of temperature on the electrochemical performance of the active battery material. The furnace was the same type used in EXAMPLE 2.

The crucible was then cooled to 25° C and immersed in water at 25° to hydrolyze and disperse the contents. The hydrolyzed material, containing about 98 wt% reacted hydrated oxide and hydroxide forms and 2 wt% unreacted $NaNiO_2$ on a dried basis, was then washed, dried at 25° C, loaded into nickel battery grids, and set opposite negative electrodes to form cells, all steps using the same techniques as described in Sample 1(a) in EXAMPLE 1.

The electrochemical activity of these electrodes are shown on FIG. 3, where the materials heated at 800°, 850° and 1100° C provided capacity values at 25 cycles of about 0.19, 0.20 and 0.23 amp-hr/g respectively. The materials heated at 600° and 700° C provided capacity values at 10 cycles of only about 0.05 and 0.15 amp-hr/g. Suitable fusion-reaction temperatures would appear from the data to be between about 800° to 1100° C or higher, although at temperatures above about 925° C the nickel reaction vessel shows signs of deterioration.

EXAMPLE 4

Electrode powder active battery material was mixed by placing in a container and thoroughly blending 7.6 grams of 99+% pure NiO (containing 5.9 grams Ni) and 0.56 grams of 99% pure cobalt oxide (containing 0.4 grams Co), to provide a 5.5 wt% cobalt concentration, with about 7.6 grams of C.P. grade $Na_2O_2$, Sample 4(a); about 9.5 grams of C.P. grade $Na_2O_2$, Sample 4(b); about 11.7 grams of C.P. grade $Na_2O_2$, Sample 4(c); and about 15.2 grams of C.P. grade $Na_2O_2$, Sample 4(d). This provided weight ratios of $NiO:Na_2O_2$ of about 1:1; 1:1.25; 1:1.5; and 1:2.0 respectively. The mixtures were then placed in a nickel crucible, heated, and then fuse-melted at a fusion-reaction temperature of 1000° C for 3 hours.

These materials were then cooled to 25° C, and immersed in water at 25° C to hydrolyze them to Co hydroxide plus Ni hydrated oxide and hydroxide forms and about 2 wt% unreacted $NaNiO_2$ on a dried basis. The material was then washed, dried at 25° C, loaded into nickel battery plaques at a loading of about 1.5 grams/sq.in., and set opposite negative electrodes to form a cell, all steps using the same techniques as described for Sample 1(a) in EXAMPLE 1.

The electrochemical activity of these electrodes are shown on FIG. 4, where the materials having weight ratios of $NiO:Na_2O_2$ of 1:1.5 provided capacity values at 25 cycles of about 0.23 and 0.22 amp-hr/g. The materials having weight ratios of $NiO:Na_2O_2$ of 1:1 and 1:1.25 provided capacity values at 25 cycles of about 0.08 and 0.15 amp-hr/g. Suitable weight ratios of $NiO:Na_2O_2$ would appear from the Figure data to be between about 1:1.35 to about 1:2.1.

EXAMPLE 5

Electrode powder active battery material was mixed by placing in a container and thoroughly blending 7.6 grams of 99+% pure NiO (containing 78 wt% or 5.9 grams Ni) and 11.7 grams of C.P. grade $Na_2O_2$, to provide a weight ratio of $NiO:Na_2O_2$ of 1:1.54, with about 0.23 grams of 99% pure cobalt oxide (containing 70 wt% or 0.16 gram Co), Sample 5(a); about 0.38 grams of 99% pure cobalt oxide (containing 0.3 gram Co), Sample 5(b); about 0.7 grams of 99% pure cobalt oxide (containing 0.49 gram Co), Sample 5(c); about 0.9 grams of 99% pure cobalt oxide (containing 0.63 gram Co), Sample 5(d); and Sample 5(e) containing no cobalt addition either before fusion or after hydrolysis. This provided cobalt concentrations, based on nickel oxide plus cobalt content as Co of approximately about 2.1 wt%, 3.8 wt%, 6.1 wt%, 7.6 wt%, and 0 wt% respectively. The mixtures were then placed in a nickel crucible, heated, and then fuse-melted at a fusion-reaction temperature of 1000° C for 3 hours.

These materials were then cooled to 25° C, and immersed in water at 25° C to hydrolyze them to about 98 wt% reacted hydrated oxide and hydroxide forms and 2 wt% unreacted $NaNiO_2$ on a dried basis. The materials were then washed, dried at 25° C, and loaded into nickel battery plaques, at loadings of 1.7 grams/sq.in. for a final plaque thickness of 70 amp-hr/g. and set opposite negative electrodes to form a cell, all steps using the same techniques as described for Sample 1(a) in EXAMPLE 1.

The electrochemical activity of these electrodes are shown on FIG. 5, where the materials having cobalt concentrations of 2.1 wt%, 3.8 wt%, 6.1 wt%, and 7.6 wt% provided the capacity values at 25 cycles of about 0.22, 0.22, 0.24 and 0.20 amp-hr/g. respectively. The material without cobalt provided a capacity value of only 0.10 amphr/g. after 25 cycles. Suitable cobalt addition from this data to provide an acceptable electrode plate ready for insertion into a battery would appear to be between about 2 wt%-12 wt% based on nickel oxide as NiO plus cobalt content as Co.

EXAMPLE 6

As a comparative example, a material, Sample 6, containing between about 95–98 wt% hydrolyxis reaction product was mixed by placing in a container and thoroughly blending 30 grams of 99+% pure NiO, (containing 24 grams Ni), and 2.2 grams of 99% pure cobalt oxide (containing 1.5 grams Co) with 50 grams of C.P. grade potassium superoxide, $KO_2$. This provided a 4.8 wt% cobalt concentration based on nickel oxide plus cobalt content and a weight ratio of $NiO:KO_2$ of about 1:1.65. This mixture was then placed in a nickel crucible and heated over about 1 hour to 800° C. The temperature was raised and maintained between 950°–1025° C for about 2 hours to ensure complete melt fusion reaction to $KNiO_2 + KCoO_2$.

This material was then cooled to 25° C, and immersed in water at 25° C to hydrolyze it. The material was then washed, dried at 25%, loaded into nickel battery plaques at a loading of about 1.5 grams/sq.in., and set opposite negative electrodes to form a cell, all steps using the same techniques as described for Sample 1(a) in EXAMPLE 1. The capacity of these electrodes, Sample 6, made substituting $KO_2$ for $Na_2O_2$, provided a capacity of 0.12 amp-hr/g. after about 25 cycles, indicating much inferior electrochemical performance for this material.

EXAMPLE 7

As a comparative example, an electrode was made, similarly to Sample 1(a) in EXAMPLE 1, where $Li_2O$ was substituted for $Na_2O_2$ in the mixture. The material contained about 3.4 wt% cobalt concentration and a weight ratio of $NiO:Li_2O$ of about 1:1.5. This mixture was fused at 1000° C to ensure substantial reaction to $CoS·Li_2O$, although the mixture remained solid due to the high melting point of $Li_2O$, cooled to 25° C, and hydrolyzed in water at 25° C. The material was then washed, dried at 25° C, loaded into nickel battery grids, and set opposite negative electrodes to form a cell, all steps using the same techniques as described for Sample 1(a) in EXAMPLE 1. The final product was a gray-black powder with some dispersed metallic-like platelets. The electrodes, Sample 7(a), made by substituting $Li_2O$ for $Na_2O_2$, had only superficial electrochemical activity. X-ray and infrared reasurements indicated that the $LiNiO_2$ contained a cubic NiO structure and not the layer-like $NiO_2$ structure found in $NaNiO_2$ necessary for electrochemical activity.

Also, electrode Sample 7(b) was made using the same techniques as described for Sample 1(a) in EXAMPLE 1, but substituting barium peroxide, $BaO_2$, for $Na_2O_2$. The final product, $BaNi_2O_5 + BaCo_2O_5$ had no electrochemical activity. X-ray structural patterns also showed NiO sites. In addition, the hydrolysis step produced $Ba(OH)_2$ which was insoluble, inactive dead weight and difficult to separate from the barium cobalt and nickel oxides by washing.

Tabulated results of the Examples are shown in the following TABLE 2:

TABLE 2

ELECTRODE MATERIAL CAPACITY: Charge at 300 mA for 2¼ hrs.; discharge at 120 mA - in 25% KOH

| Sample | Wt. Ratio NiO:Na$_2$O$_2$ | Approximate % Co in Final Hydrolyzed Material | Fusion Temp. and Time | Plaque Loading g/sq.in. | Capacity amp-hr/gram 10 cycles | Capacity amp-hr/gram 25 cycles |
|---|---|---|---|---|---|---|
| 1(a) | 1:1.54 | 3.4% | 950°–1025° C (1 hr) | 1.5 | 0.215 | 0.225 |
| 1(b) | 1:1.54 | 3.4% | 950°–1025° C (1 hr) | 2.5 | 0.20 | 0.20 |
| 1(c) | 1:1.54 | 4.4% | 950°–1025° C (1 hr) | 1.5 | 0.185 | 0.19 |
| 2(a) | 1:1.54 | 5.5% | 1000° C (20 min) | 1.5 | 0.17 | 0.17 |
| 2(b) | 1:1.54 | 5.5% | 1000° C (1 hr) | 1.5 | 0.21 | 0.21 |
| 2(c) | 1:1.54 | 5.5% | 1000° C (1.5 hr) | 1.5 | 1.22 | 0.22 |
| 2(d) | 1:1.54 | 5.5% | 1000° C (3 hr) | 1.5 | 0.23 | 0.23 |
| 3(a) | 1:1.54 | 5.5% | 600° C (6 hr) | 1.5 | 0.05 | (none) |
| 3(b) | 1:1.54 | 5.5% | 700° C (6 hr) | 1.5 | 0.15 | 0.15 |
| 3(c) | 1:1.54 | 5.5% | 800° C (6 hr) | 1.5 | 0.17 | 0.19 |
| 3(d) | 1:1.54 | 5.5% | 850° C (6 hr) | 1.5 | 0.19 | 0.20 |
| 3(e) | 1:1.54 | 5.5% | 1100° C (2 hr) | 1.5 | 0.23 | 0.23 |
| 4(a) | 1:1.0 | 5.5% | 1000° C (3 hr) | 1.5 | 0.08 | 0.08 |
| 4(b) | 1:1.25 | 5.5% | 1000° C (3 hr) | 1.5 | 0.16 | 0.16 |
| 4(c) | 1:1.5 | 5.5% | 1000° C (3 hr) | 1.5 | 0.23 | .23 |
| 4(d) | 1:2.0 | 5.5% | 1000° C (3 hr) | 1.5 | 0.22 | 0.22 |
| 5(a) | 1:1.54 | 2.1% | 1000° C (3 hr) | 1.7 | 0.22 | 0.22 |
| 5(b) | 1:1.54 | 3.8% | 1000° C (3 hr) | 1.7 | 0.22 | 0.22 |
| 5(c) | 1:1.54 | 6.1% | 1000° C (3 hr) | 1.7 | 0.24 | 0.24 |
| 5(d) | 1:1.54 | 7.6% | 1000° C (3 hr) | 1.7 | 0.20 | 0.20 |
| 5(e) | 1:1.54 | 0% | 1000° C (3 hr) | 1.7 | 0.10 | 0.10 |
| 6 | NiO:KO$_2$ 1:1.65 | 4.8% | 950°–1025° C (2 hr) | 1.5 | — | 0.12 |
| 7(a) | NiO:LiO$_2$ 1:1.54 | 3.4% | 950°–1025° C (1 hr) | 1.5 | none | none |
| 7(b) | NiO:BaO$_2$ 1:1.54 | 3.4% | 950°–1025° C (1 hr) | 1.5 | none | none |

EXAMPLE 8

In order to determine the effect of drying temperature on the electrochemical capacity of the active material, an electrode was made, similarly to Sample 2(d) in EXAMPLE 2 but using drying temperatures after hydrolysis of 25° C, 30° C, 40° C, 45° C, 70° C and 90° C. The material contained about 6.5 wt% cobalt concentration and a weight ratio of NiO:Na$_2$O$_2$ of about 1:1.54. The mixture was fused in a nickel crucible at 1000° C as in EXAMPLE 2 to ensure complete conversion to NaNiO$_2$. After cooling and hydrolysis, the active battery material powder contained about 98 wt% reacted hydrated oxide and hydroxide forms and 2 wt% unreacted NaNiO$_2$ on a dried basis.

The material was washed and then Samples 8(a)–8(f) were air dried at the above described temperatures. The Samples were then sieved to −325 mesh and loaded into nickel battery plaques as in EXAMPLE 2. The electrodes were pressed and had approximately the same loadings as in EXAMPLE 2. These nickel electrodes were set opposite negative electrodes in several containers, and contacted with electrolyte to form electrochemical cells. The electrodes were formed as in EXAMPLE 2. The capacity of the electrodes after level performance was attained at about 25 cycles is shown in the following TABLE 3:

creased over 70° C. It is believed that, even though the Ni$_3$O$_4$ . 2H$_2$O does not convert to a cubic inactive form until about 130° C; interlaminar bonding in the battery material starts to occur above about 60°–70° C; and that this along with interlaminar water loss apparently makes the material dried over about 65° C ineffective as a battery material.

What exactly happens is not completely undestood at this time; it is known, however, that when the electrode material, containing a mixture of Ni (II) and Ni (III) forms, and which is believed to have a stoichiometry of nickel hydrated oxide Ni$_3$O$_4$ . 2H$_2$O, is dried at temperatures over 65° C, it becomes progressively inactive and is not useful as a battery material. It is critical then that the active material of this invention only be dried between about 15°–65° C and preferably at 25° C. At the higher temperatures of about 65° C a high humidity environment could be used to minimize interlaminar water loss.

The infrared and Raman spectra of the fully hydrolyzed product, containing nickel forms which correspond to a stoichiometry of Ni$_3$O$_4$ · 2H$_2$O, when dried below 65° C, shows a center of symmetry and layer-like —O—Ni—ONi—O—Ni—O— structure with water molecules dispersed in interlaminar positions. The crystalline layer structure is hexagonal and belongs to the same group $D_{d3}^3$ (P$\bar{3}$m).

TABLE 3

ELECTRODE MATERIAL CAPACITY: Charge at 300 mA for 2¼ hrs.; discharge at 120 mA - in 25% KOH

| Drying Temp. | Sample | Wt. Ratio NiO:Na$_2$O$_2$ | Fusion Temp. and Time | Plaque Loading g./sq. in. | Capacity amp-hr/gram 25 Cycles |
|---|---|---|---|---|---|
| 25° C | 8(a) | 1:1.54 | 1000° C (3 hr) | 1.5 | 0.235 |
| 30° C | 8(b) | 1:1.54 | 1000° C (3 hr) | 1.5 | 0.232 |
| 40° C | 8(c) | 1:1.54 | 1000° C (3 hr) | 1.5 | 0.215 |
| 45° C | 8(d) | 1:1.54 | 1000° C (3 hr) | 1.5 | 0.198 |
| 70° C | 8(e) | 1:1.54 | 1000° C (3 hr) | 1.5 | 0.115 |
| 90° C | 8(f) | 1:1.54 | 1000° C (3 hr) | 1.5 | 0.020 |

As can be seen, there is a dramatic decrease in electrochemical activity as the drying temperature is increased.

Unexpectedly, only the Na$_2$O$_2$ + NiO reaction product, when the components are reacted within critical weight percent, temperature and time ranges, and when combined with critical weight percent Co during fusion, during hydrolysis, after hydrolysis or after plaque pasting, provides suitable high performance active battery material for use in making battery electrode plates. This active material, formed by hydrolyzing $NaNiO_2$ and adding about 2–12 wt% Co based on NiO plus Co has a capacity of at least 0.185 amp-hr/gram. When it is used in a metallic plaque it provides an electrode that can be alternately stacked in a container opposite negative electrodes, such as for example electrodes containing iron active battery material, with separators therebetween and a suitable caustic electrolyte contacting the electrodes and separators, with suitable electrical connections, to provide a battery.

We claim as our invention:

1. A method of making an active battery electrode powder, comprising the steps of:
   a. mixing an admixture of NiO and $Na_2O_2$, wherein the weight ratio of NiO: $Na_2O_2$ is between about 1:1.35 to about 1:2.1;
   b. heating the admixture at a reaction temperature of between about 800°–1150° C, for about ½ hour to 8 hours to melt the admixture and form a reaction product comprising $NaNiO_2$;
   c. hydrolyzing the reaction product comprising $NaNiO_2$ in water at between 20°–95° C, forming a battery material comprising Ni hydroxide forms and then washing the battery material; and
   d. maintaining the activity of the battery material by maintaining the temperature of the material below about 65° C.

2. The method of claim 1 wherein cobalt additive selected from the group of Co, $Co_2O_3$, $Co_3O_4$ and CoO and their mixtures is mixed with the NiO and $Na_2O_2$ in step (a) providing a battery material with about 2–12 wt% Co based on NiO plus Co content and the battery material is dried between about 15°–65° C in step (d).

3. The method of claim 2 wherein the nickel oxide, cobalt additive and $Na_2O_2$ are in substantially pure form.

4. The method of claim 2 wherein the Ni hydroxide forms comprise a material having a stoichiometry of $Ni_3O_4 \cdot 2H_2O$, said material after drying being in crystalline layer form with interlaminar water.

5. The method of claim 4 wherein the crystalline structure of the material after drying has a center of symmetry and layer like —O—Ni—O—Ni—O—Ni—O— structure with water molecules dispersed in interlaminar positions.

* * * * *